US008297570B2

(12) United States Patent
Noyes

(10) Patent No.: US 8,297,570 B2
(45) Date of Patent: Oct. 30, 2012

(54) ADJUSTABLE MOUNT ASSEMBLY FOR A CARRIER SYSTEM

(75) Inventor: Bobby Noyes, Boulder, CO (US)

(73) Assignee: Rocky Mounts, Boulder, CO (US)

( * ) Notice: Subject to any disclaimer, the term of this patent is extended or adjusted under 35 U.S.C. 154(b) by 224 days.

(21) Appl. No.: 12/868,881

(22) Filed: Aug. 26, 2010

(65) Prior Publication Data

US 2011/0062300 A1    Mar. 17, 2011

Related U.S. Application Data

(60) Provisional application No. 61/241,460, filed on Sep. 11, 2009.

(51) Int. Cl.
*A47B 96/06* (2006.01)

(52) U.S. Cl. ............ 248/214; 248/230.9; 248/503; 224/319; 224/325

(58) Field of Classification Search ........... 248/540, 248/541, 72, 214, 228.8, 230.9, 503; 224/400, 224/309, 314, 319, 325
See application file for complete search history.

(56) References Cited

U.S. PATENT DOCUMENTS

| 1,412,189 | A | * | 4/1922 | Lopdell | 24/278 |
|---|---|---|---|---|---|
| 1,625,319 | A | * | 4/1927 | Kenerson | 269/97 |
| 1,641,559 | A | * | 9/1927 | Thompson | 24/279 |
| 1,653,083 | A | * | 12/1927 | Blaw | 248/538 |
| 1,917,192 | A | * | 7/1933 | Hueber | 248/230.9 |
| 3,894,707 | A | * | 7/1975 | Heard | 248/230.9 |
| 4,460,142 | A | * | 7/1984 | O'Rorke | 248/230.8 |
| 4,659,046 | A | * | 4/1987 | Parduhn | 248/230.9 |
| 5,645,255 | A | * | 7/1997 | Parduhn | 248/214 |
| 6,357,709 | B1 | * | 3/2002 | Parduhn | 248/229.17 |
| 6,681,971 | B2 | * | 1/2004 | Laverack et al. | 224/319 |
| 6,793,186 | B2 | * | 9/2004 | Pedersen | 248/229.13 |
| 7,108,163 | B1 | | 9/2006 | Pedrini | |
| 2006/0237500 | A1 | * | 10/2006 | Settelmayer | 224/325 |

* cited by examiner

*Primary Examiner* — Bradley Duckworth
(74) *Attorney, Agent, or Firm* — The Ollila Law Group LLC

(57) ABSTRACT

An adjustable mount assembly (100) is provided. The adjustable mount assembly (100) comprises a body (205) and an adjustment member (207) coupled to the body (205). The adjustment member (207) includes a threaded member (316) and a tension bar (210) coupled to the threaded member (316). The adjustable mount assembly (100) also includes one or more retaining member receivers (208A, 208B) formed in the body (205). One or more retaining members (206A, 206B) are provided with each of the one or more retaining members (206A, 206B) coupled to the tension bar (210) at a first end (206A', 206B') and adapted to engage the retaining member receiver (208A, 208B) at a second end (206A", 206B").

14 Claims, 6 Drawing Sheets

ADJUSTABLE MOUNT ASSEMBLY FOR A CARRIER SYSTEM

RELATED APPLICATION

This application claims the benefit of US provisional application No. 61/241,460 filed on Sep. 11, 2009 entitled "Adjustable Mount Assembly for a Carrier System".

TECHNICAL FIELD

The present invention relates to a mount assembly, and more particularly, to an adjustable mount assembly for a carrier system.

BACKGROUND OF THE INVENTION

Many vehicles are unable to carry large items, such as bicycles, skis, luggage, etc. within the cabin. As a result, a variety of vehicles are provided with carrier racks or supports, which are adapted to support particular vehicle mounting assemblies. The carrier supports typically have a mount support with a circular or oval shaped rod that extends at least partially across the vehicle's roof. The mount support is then typically connected to the roof of the vehicle. A vehicle carrier system can then be attached to the mount support in order to transport one or more items such as bicycles, skis, luggage, etc. on the roof of the vehicle. It is important that the mount assembly fit properly and securely on the mount support to prevent the carrier system from moving or freeing from the mount support.

While this arrangement has received some success, one problem typically faced by users is that the mount assembly of a particular carrier system may only be adapted to connect to a particular mount support. Therefore, if a user wishes to change vehicles, the user is typically faced with the option of either buying a new carrier system to accommodate a new carrier mount support design of the new vehicle or purchasing a vehicle with the same carrier mount support configuration. Neither option provides an ideal solution.

Prior art attempts at solving the problem of providing a carrier system including a mounting assembly that can be adapted to be used with a wide variety of mount support configurations have not proved reliable. Prior art carrier systems that claim to be universal often result in a mount assembly that fits poorly on many mount support configurations, resulting in a potentially dangerous situation. One such prior art attempt is disclosed in U.S. Pat. No. 7,108,163. The '163 patent is directed towards a system for securing an equipment carrier to a vehicle-mounted support. While the '163 patent includes an adjustable strap that wraps around a mount support, the system has a number of drawbacks. For example, the system disclosed in the '163 patent includes a plurality of teeth on the adjustable strap that engage corresponding teeth on a releasable retainer. With each use of the system, the teeth are subject to continuous wear and eventual failure of the system. Furthermore, the tightening member is located on the top of the assembly. As a result, adjustment of the tension in the strap is made difficult when mounted on the top of a vehicle. In addition, the system is provided in two distinct pieces that are not connected together when removed from the vehicle. As a result, the system can easily be separated from one another and lost resulting in an inoperable system. Another drawback to the system disclosed in the '163 patent is the extreme bending angle the strap must make in order to wrap around a mount support. If the mount support is any wider than the base through which the straps extend, the strap is subject to a serious bend that may permanently deform the strap. Therefore, while the '163 patent claims to provide a universal carrier system, in actuality, the system is seriously limited in the potential acceptable mount supports that the system can be used with.

There is a need in the art for a reliable mount assembly that can be adjusted to mount on a variety of mount supports with different cross-sectional configurations. Furthermore, there is a need in the art for a reliable mount assembly that is easy and fast to use. The present invention overcomes these and other problems and an advance in the art is achieved. The present invention provides an adjustable mount assembly for a carrier system that is capable of coupling to a wide variety of mount supports. Furthermore, the present invention provides an adjustment member that can quickly and easily increase the tension in the adjustable mount assembly in order to securely hold the adjustable mount assembly onto the mount support.

SUMMARY OF THE INVENTION

An adjustable mount assembly is provided according to an embodiment of the invention. The adjustable mount assembly comprises a body and an adjustment member coupled to the body. The adjustment member includes a threaded member and a tension bar. The tension bar is coupled to the threaded member. The adjustable mount assembly also includes one or more retaining member receivers formed in the body. One or more retaining members are also provided. Each of the one or more retaining members is coupled to the tension bar at a first end and adapted to engage the retaining member receiver at a second end.

A method of forming an adjustable mount assembly is provided according to an embodiment of the invention. The method comprises the step of coupling an adjustment member to a body, wherein the adjustment member includes a threaded member and a tension bar coupled to the threaded member. The method also comprises the step of forming one or more retaining member receivers in the body. According to an embodiment of the invention, the method also comprises the step of coupling a first end of a retaining member to the tension rod such that a second end of the retaining member is adapted to engage the retaining member receiver.

A method of coupling an adjustable mount assembly to a mount support is provided according to an embodiment of the invention. The adjustable mount assembly includes a body, an adjustment member, one or more retaining members coupled to the adjustment member at a first end, and one or more retaining member receivers formed in the body of the adjustable mount assembly. The method comprises the step of positioning the body of the adjustable mount assembly proximate a mount support. The method further comprises the steps of wrapping a portion of the one or more retaining members around a portion of the mount support and coupling a second end of the one or more retaining members to the one or more retaining member receivers. According to an embodiment of the invention, the method also comprises the step of actuating the adjustment member to move the first end of the one or more retaining members in a first direction thereby increasing the tension in the one or more retaining members to secure the adjustable mount assembly to the mount support.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
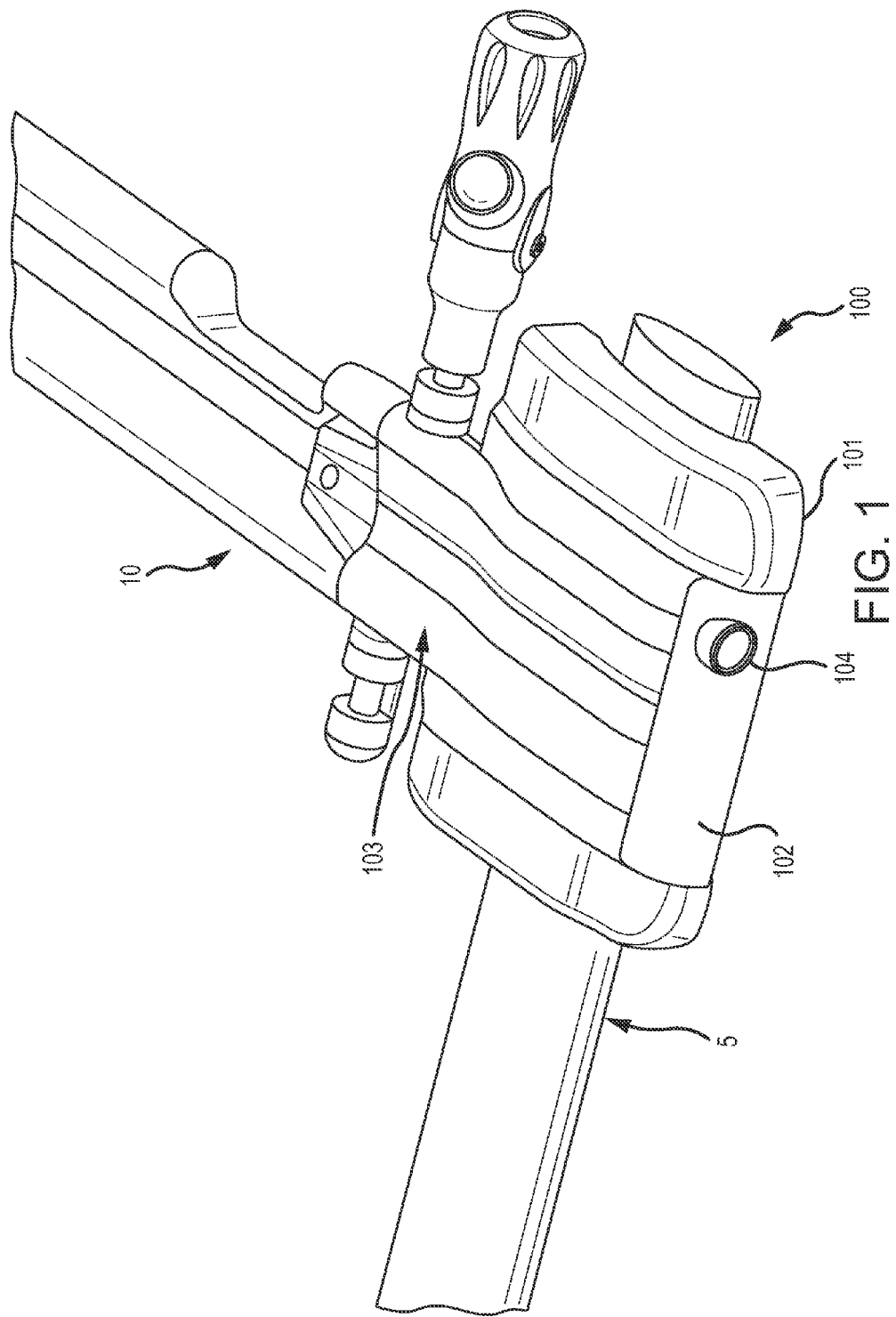
FIG. 1 shows an adjustable mount assembly according to an embodiment of the invention.

FIG. 1 shows an adjustable mount assembly 100 for a carrier system 10 according to an embodiment of the invention. The adjustable mount assembly 100 includes a housing 101, an access covering 102, and a carrier system engagement member 103. The carrier system engagement member 103 can be adapted to couple the adjustable mount assembly 100 to an associated carrier system 10 that is partially shown in FIG. 1. The carrier system 10 may comprise a wide variety of devices, such as a ski carrier, a bicycle carrier, a luggage carrier, etc. The particular carrier system coupled to the adjustable mount assembly 100 is not important for the purposes of the present invention and therefore, should in no way limit the scope of the present invention. In use, the adjustable mount assembly 100 is adapted to engage and couple to a mount support 5. Although the description that follows is particularly directed towards a vehicle mount support, it should be appreciated that the adjustable mount assembly 100 may be adapted to couple to a wide variety of mount supports. For example, a suitable mount support may be provided for storage such as in a garage or basement. Therefore, the adjustable mount assembly 100 may be coupled to the storage mount support 5 in order to temporarily store the carrier system 10 when not in use.

In some embodiments, the adjustable mount assembly 100 can also include an access covering 102 with a release button 104. According to an embodiment of the invention, the access covering 102 is located proximate an adjustment member 207 (See FIG. 2). According to an embodiment of the invention, the access covering 102 can be removed from the housing 101 or rotated away from the position shown in FIG. 1 in order to access the adjustment member 207. The access covering 102 may include an engagement member (not shown) that releasably engages the housing 101. According to an embodiment of the invention, the release button 104 can disengage the engagement member from the housing (101) in order to remove the access covering 102. When in place, the access covering 102 may prevent dirt and debris from interfering with the adjustable member 207, for example.

Figure 2:
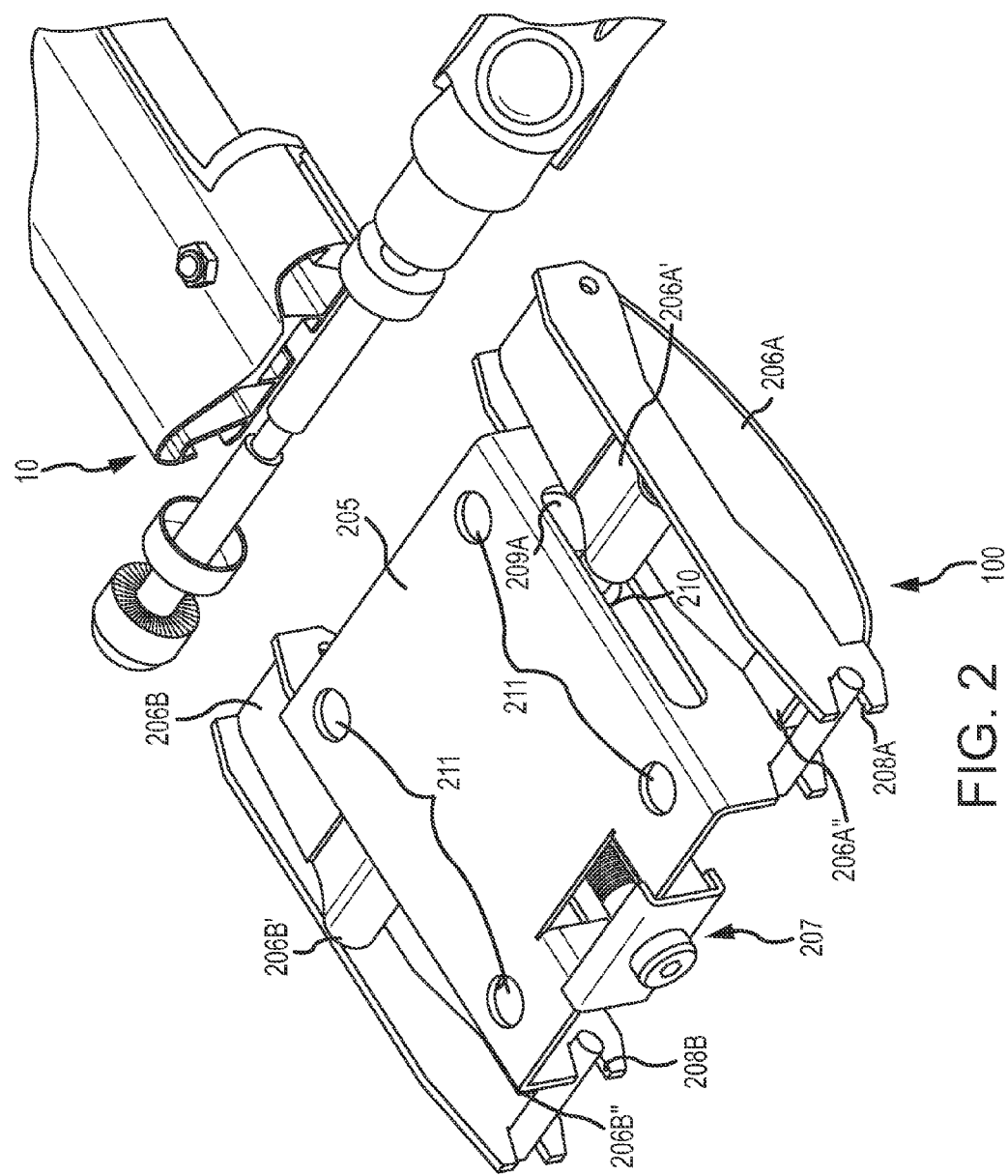
FIG. 2 shows the adjustable mount assembly according to an embodiment of the invention.

FIG. 2 shows the adjustable mount assembly 100 with the housing 101 removed according to an embodiment of the invention. The housing 101 is removed in FIG. 2 in order to show some of the internal components of the adjustable mount assembly 100. It should be appreciated that in some embodiments the housing 101 may be omitted; however, when provided, the housing 101 can protect the interior components of the adjustable mount assembly 100. As can be seen in FIG. 2, the adjustable mount assembly 100 includes a body 205, one or more retaining members 206A, 206B, an adjustment member 207, and one or more retaining member receivers 208A, 208B adapted to receive a portion of the one or more retaining members 206A, 206B. The body 205 also includes one or more apertures 211 that are adapted to receive stems 315 (See FIG. 3) that extend from the housing 101. The stems 315 may engage the one or more apertures 211 formed in the body 205 in order to removably couple the housing 101 to the body 205. It should be appreciated that the housing 101 may be coupled to the body 205 in any number of alternative ways including, but not limited to, adhesives, bonding, brazing, etc. Therefore, the use of stems 315 inserted into the apertures 211 should in no way limit the scope of the present invention.

According to an embodiment of the invention, the retaining members 206A-B comprise a flexible material adapted to at least partially surround a mount support 5 and retain the adjustable mount assembly 100 against the mount support 5. Those skilled in the art will readily recognize suitable materials for the retaining members 206A, 206B. While the present embodiment is described as comprising two retaining members, 206A and 206B, it should be appreciated that in some embodiments, the adjustable mount assembly 100 may comprise a single retaining member 206 or more than two retaining members 206A-206N, where N is the total number of retaining members. Therefore, the particular number of retaining members 206 should not limit the scope of the present invention. Furthermore, because the first retaining member 206A and the second retaining member 206B are substantially the same, the description that follows discusses a retaining member 206, with the letter A or B dropped from the description. However, it should be appreciated that the retaining member 206 may comprise either the first or the second retaining members 206A, 206B. While the retaining member 206 is shown as comprising a thin flexible strap, those skilled in the art will easily recognize other configurations that may provide suitable alternatives. Therefore, the particular shape chosen should not limit the scope of the present invention. However, the retaining member 206 should be capable of withstanding a threshold level of tension so as to secure the adjustable mount assembly 100 to a mount support 5 while remaining flexible enough to wrap around the mount support 5. According to an embodiment of the invention, the retaining members 206 comprise a first end 206' and a second end 206". As can be seen, the first end 206' is coupled to a tension bar 210 while the second end 206" of the retaining member 206 is received and secured in the retaining member receiver 208. As can be appreciated, the second end 206" securely fits within the retaining member receiver 208 in a fixed position rather than being adjustable. As a result, the second end 206" is less susceptible to wear than prior art systems that allow the point at which the second end is secured to be adjusted.

According to an embodiment of the invention, the tension bar 210 comprises a portion of the adjustment member 207. As can be seen, the adjustment member 207 is coupled to the body 205. According to an embodiment of the invention, the adjustment member 207 extends from a front surface of the body 205, allowing easier access to the adjustment member 207 than in the prior art. It should be appreciated however, that the adjustment member 207 may be extend from other surfaces of the body 205 and the particular embodiment shown is merely an example.

While the retaining member receiver 208 is shown as comprising a fork that receives the second end 206", it should be appreciated that the retaining member receiver 208 may comprise a variety of other suitable configurations that are capable of retaining the second end 206" of the retaining member 206, such as a clamping member, for example.

Figure 3:
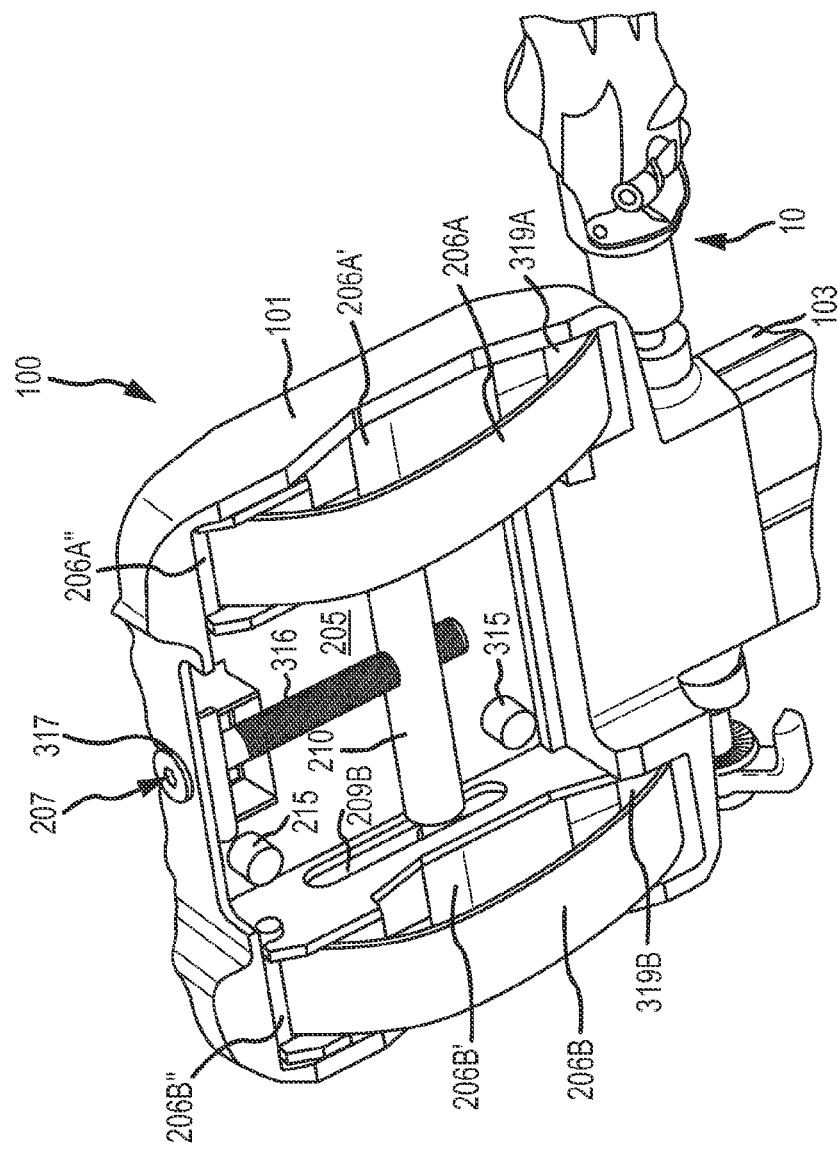
FIG. 3 shows a bottom view of the adjustable mount assembly according to an embodiment of the invention.

According to an embodiment of the invention, the body 205 also includes one or more channels 209A, 209B (only channel 209A is visible in FIG. 2, see FIG. 3 for channel 209B). According to an embodiment of the invention, the tension bar 210 is adapted to at least partially fit in the one or more channels 209A, 209B and can be configured to slide or otherwise move along the length of the one or more channels 209A, 209B in order to adjust the tension in the retaining members 206. According to an embodiment of the invention, the tension bar 210 extends through the one or more channels 209A, 209B and is adapted to couple to a portion of the retaining member 206. According to an embodiment of the invention, with a portion of the adjustment member 207 coupled to the body 205, the tension bar 210 can move within the one or more channels 209 upon actuating the adjustment member 207 in order to adjust the tension in the retaining member 206. By increasing the tension in the retaining members 206, the adjustable mount assembly 100 is held more securely against the mount support 5 as will be described in greater detail below. Although one tension bar 210 is shown that is coupled to two retaining members 206A, 206B, it should be appreciated that in other embodiments, each retaining member 206 may include a separate tension bar 210. In addition, in some embodiments a separate adjustment member 207 is provided for each retaining member 206.

FIG. 3 shows a bottom view of the adjustable mount assembly 100 according to an embodiment of the invention. As can be seen in FIG. 3, the stems 315 of the housing 101 extend through the apertures 211 formed in the body 205 in order to couple the housing 101 to the body 205. In the embodiment shown in FIG. 3, the access covering 102 is removed in order to better illustrate the adjustment member 207. As can be seen more clearly in FIG. 3, according to an embodiment of the invention, the adjustment member 207 comprises the tension bar 210, which engages a threaded member 316. According to an embodiment of the invention, the threaded member comprises a bolt 316. It should be appreciated that other arrangements are contemplated for the adjustment member 207 and therefore, the present invention should not be limited to a threaded member. For example, the threaded member 316 may be replaced with a ratchet type assembly. According to an embodiment of the invention, the bolt 316 can extend through an opening 317 formed in the housing 101 and be rotatably coupled to the body 205. Advantageously, a user can rotate the bolt 316 relative to the housing 101 and the body 205 resulting in the tension bar 210 moving in either a first direction (towards the opening 317 in the housing) or in a second direction (away from the opening 317 formed in the housing). According to an embodiment of the invention, the tension in the retaining members 206 increases or decreases depending on the direction the tension bar 210 moves upon actuating the adjustment member 207.

Also visible in FIG. 3 are rollers 319. In FIG. 3, the adjustable mount assembly includes two rollers 319A, 319B, with one roller 319 corresponding to each retaining member 206. As can be seen, the rollers 319A, 319B are located such that the retaining member 206 extends from the tension bar 210 in a first direction, wraps around the roller 319, and extends in a second direction. According to the embodiment shown, the first and second directions are substantially opposite one another. According to an embodiment of the invention, the rollers 319A, 319B comprise pins that extend from the body 205 and are rotatable with respect to the body 205. Therefore, as the retaining member 206 is tightened or loosened upon actuating the adjustment member 207, the rollers 319A, 319B can turn rather than requiring the retaining member 206 to slide over a fixed member. While the rollers 319A, 319B may be omitted in some embodiments, the rollers 319A, 319B may extend the life of the retaining members 206A, 206B by reducing the friction experienced by the retaining members 206A, 206B when adjusting the tension. It should be appreciated that while the rollers 319A, 319B are not required in all embodiments, the rollers 319A, 319B may be provided so the retaining member 206 wraps around the mount support 5 in a more symmetrical manner. This can be seen better in FIGS. 5 & 6.

Figure 4:
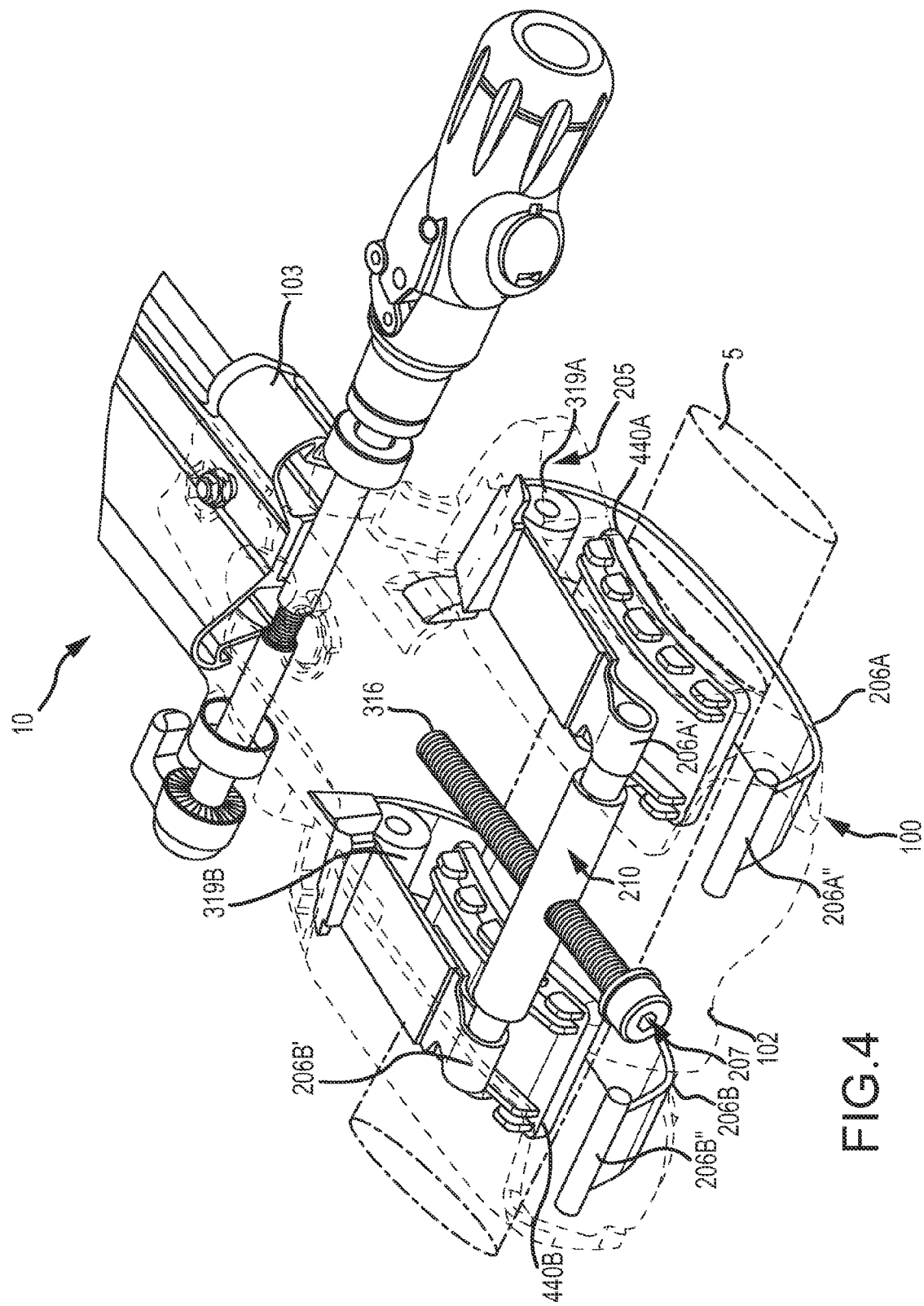
FIG. 4 shows the adjustable mount assembly according to another embodiment of the invention.

FIG. 4 shows the adjustable mount assembly 100 according to another embodiment of the invention. In the embodiment shown in FIG. 4, the housing 101, the body 205, and the mount support 5 are shown in phantom lines in order to better illustrate the interior components of the mount assembly 100. In addition to the components shown in the previous figures, FIG. 4 shows a mount support pad 440A, 440B associated with each retaining member 206A, 206B. According to an embodiment of the invention, the mount support pads 440A, 440B are coupled to the body 205 and are provided to engage a top surface of the mount support 5. The support pads 440 may be at least partially flexible in order to at least partially conform to the shape of the mount support 5. In other embodiments the support pads 440 may be substantially rigid. According to an embodiment of the invention, the support pads 440 are provided to contact the mount support 5 rather than resting on the first end 206' of the retaining member 206.

As can easily be seen in FIG. 4, starting from the first end 206', which is coupled to the tension bar 210, the retaining member 206 extends in a first direction above the support pad 440 towards the roller 319. The retaining member 206 wraps at least partially around the roller 319 and extends back in a second direction. The retaining member 206 wraps around a portion of the mount support 5 and extends toward the retaining member receiver 208. It should be appreciated that the retaining member 206 is wrapped around the mount support 5 such that the mount support 5 is positioned between the body 205 and the retaining member 206. In embodiments including the support pad 440, the mount support 5 can be positioned between the support pad 440 and the retaining member 206. So long as there is adequate slack in the retaining member 206, i.e., the tension is relatively small, the second end 206" of the retaining member 206 can be received in the retaining member receiver 208 (not shown in FIG. 4).

In order to increase the tension in the retaining member 206 and thereby tighten the retaining members 206 around the mount support 5, the adjustment member 207 can be used to move the tension bar 210, and therefore, move the first end 206' of the retaining member 206. As an example, the threaded member 316 may be rotated relative to the body 205 in a clockwise direction. As the bolt 316 rotates, the tension bar 316 will move in a first direction up the threads as is generally known in the art. As the tension bar 316 moves, so do the first ends 206' of the retaining members 206 thereby decreasing the length of the retaining members 206 between the second end 206" and the roller 319. This reduction in length tightens the mount support 5 between the retaining member 206 and the support pads 440 to secure the adjustable mount assembly 100 to the mount support 5.

In order to remove the adjustable mount assembly 100 from the mount support 5, the adjustable member 207 may be actuated in the opposite direction that is described above. As the bolt 316 is rotated in the opposite direction, the tension bar 316 moves in a second direction, which is substantially opposite the first direction. As the tension bar 316 moves in the second direction, the tension in the retaining member 206 decreases. Once the tension in the retaining member 206 decreases to a threshold level, the second end 206" of the retaining member 206 may be removed from the retaining member receiver 208 and the adjustable mount assembly 100 may be removed from the mount support 5. The threshold tension level may depend upon a number of factors including, but not limited to the material used for the retaining member 206, the strength of the user, the size of the mount support, etc.

Figure 5:
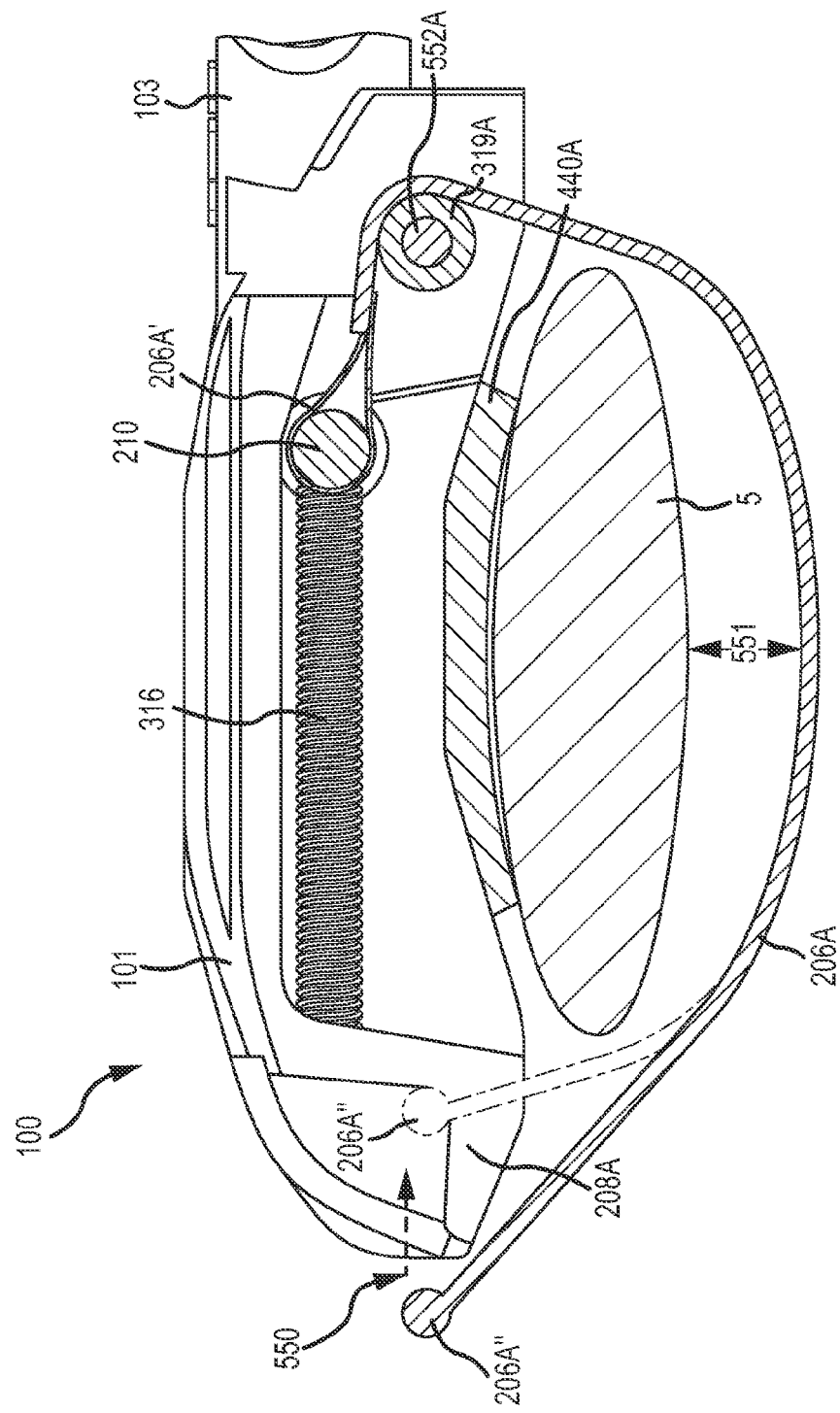
FIG. 5 shows a partial cross-sectional view of the adjustable mount assembly according to an embodiment of the invention.

FIG. 5 shows a partial side cross-sectional view of the adjustable mount assembly 100 according to an embodiment of the invention. As can be seen, the adjustable mount assembly 100 is positioned proximate the mount support 5 and has engaged the mount support 5. In the embodiment shown, the support pad 440A is shown engaged with the top surface of the mount support 5. Therefore, in embodiments including the support pad 440A, the body 205 may be positioned proximate the mount support 5, but may not be contacting the mount support 5.

As can be seen, the tension bar 210 is in a fully retracted position resulting in a maximum length of the retaining member 206A being positioned between the roller 319A and the retaining member receiver 208A. Also seen in FIG. 5 is a pin 552A, which is positioned within the roller 319A. It can therefore be appreciated that the roller 319A rotates around the pin 552A as the position of the retaining member 206A changes. With the adjustable mount assembly 100 positioned adjacent the mount support 5, the retaining member 206A can be wrapped at least partially around the mount support 5. With the retaining member 206A extending beyond the mount support 5, the second end 206A" of the retaining member 206A can be inserted into the retaining member receiver 208A formed in the body 205 as shown by the arrow 550 in order to secure the second end 206A" of the retaining member 206A. However, because the adjustment member 207 has not been actuated, the retaining member 206A is relatively loose resulting in a gap 551 between the bottom surface of the mount support 5 and the retaining member 206A.

Figure 6:
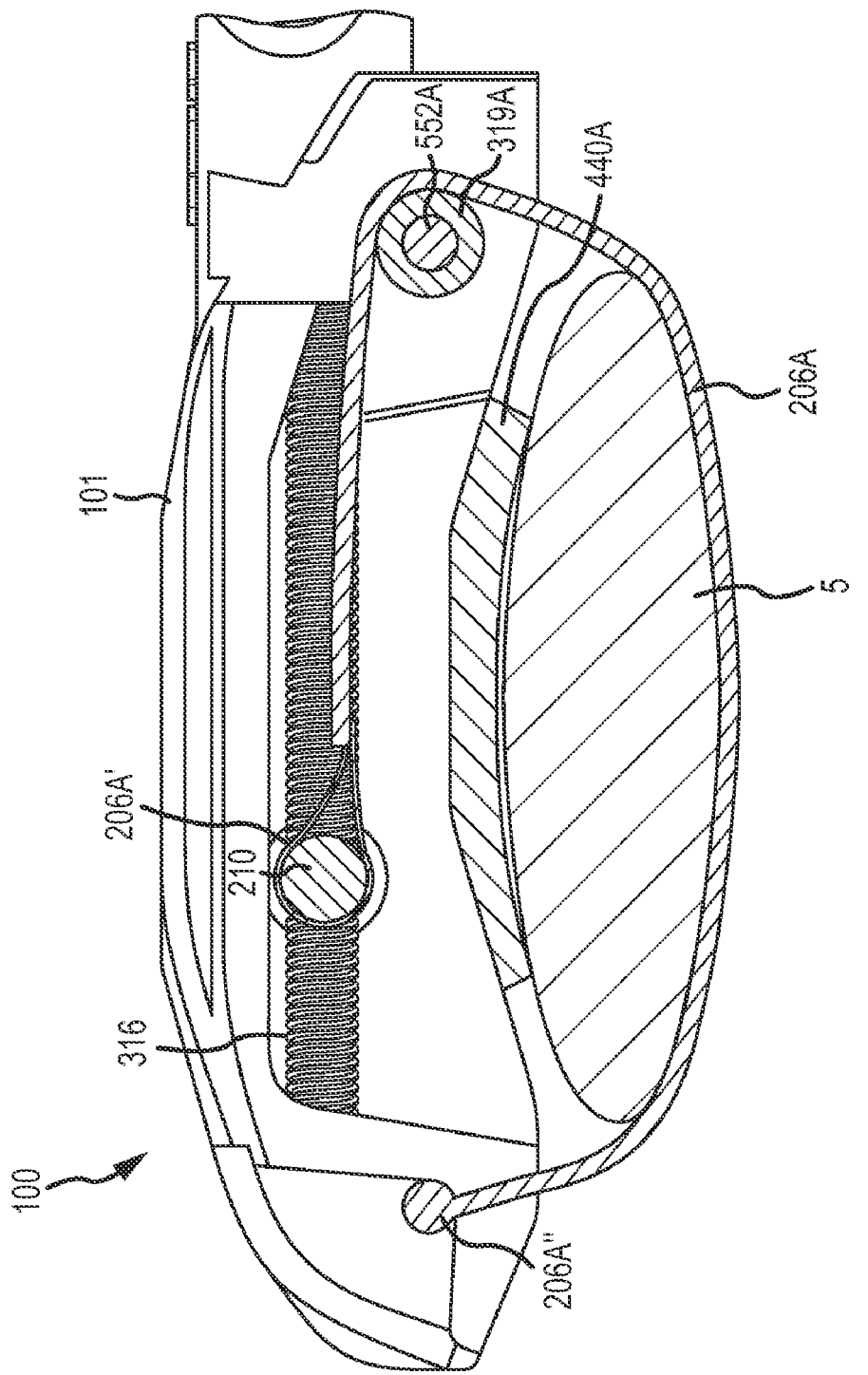
FIG. 6 shows a partial cross-sectional view of the adjustable mount assembly according to another embodiment of the invention.

FIG. 6 shows a partial cross-sectional view of the adjustable mount assembly 100 according to an embodiment of the invention. In the embodiment shown in FIG. 6, the adjustment member 207 has been actuated. Once the adjustment member 207 is actuated, the tension bar 210 along with the first end 206A' of the retaining member 206A moves from a first position (FIG. 5) to a second position (FIG. 6). As the first end 206A' moves toward the second position, the tension in the retaining member 206A increases and the gap 551 decreases. Further movement of the first end 206A' of the retaining member 206A closes the gap 551 and the retaining member 206A is tightened around the mount support 5. This tightening secures the adjustable mount assembly 100 to the mount support 5. It can be appreciated that the amount of actuation required by the adjustment member 207 will depend upon a number of factors including the material used for the retaining member 206A, the size of the mount support, and the amount the adjustment member 207 was actuated by the user. As can be appreciated, because the adjustment member 207 can be actuated to different positions, the adjustable mount assembly 100, and more specifically, the retaining member 206 can be adjusted to fit tightly around a wide variety of mount supports 5. Therefore, the adjustable mount assembly 100 can be used with many different mount support systems. In some embodiments, the support pad 440A at least partially compresses and therefore allows further actuation of the adjustment member 207. As can be appreciated with the roller 319A in place, the retaining member 206A extends from the body 205 and wraps around the mount support 5 in a substantially symmetrical manner. Furthermore, because the roller 319A is positioned near the outer surface of the mount support 5, the angle imposed on the retaining member 206 is substantially reduced. In contrast, if the roller 319A were not in place, the retaining member 206 would extend from the tension bar 210 and contact the top surface of the support pad 440 thereby wrapping around the mount support 5 at a greater angle. This increase in the bending of the retaining member 206A could decrease the life of the retaining member 206A.

With the retaining member 206A substantially tightened around the mount support 5, the adjustable mount assembly 100 is securely held in place. As explained above, removal of the adjustable mount assembly 100 can be accomplished by reversing the above steps.

The embodiments of the present invention as described above provide an adjustable mount assembly 100 that can advantageously be coupled to a wide variety of mount supports 5. As a result, rather than requiring a different mount assembly for each type of mount support a user may have, the adjustable mount assembly 100 may be adjusted to fit mount supports with different sizes and shapes.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other mounting assemblies, and not just to the embodiments described above and shown in the accompanying figures. Accordingly, the scope of the invention should be determined from the following claims.

I claim:

1. An adjustable mount assembly (100), comprising:
   a body (205);
   an adjustment member (207) coupled to the body (205) and including a threaded member (316) and a tension bar (210) coupled to the threaded member (316);
   one or more retaining member receivers (208A, 208B) formed in the body (205);
   one or more retaining members (206A, 206B) with each of the one or more retaining members (206A, 206B) coupled to the tension bar (210) at a first end (206A', 206B') and adapted to engage the retaining member receiver (208A, 208B) at a second end (206A", 206B"); and
   one or more channels (209A 209B) formed in the body (205), wherein the tension bar (210) is sized and located to move within the one or more channels (209A 209B).

2. The adjustable mount assembly (100) of claim 1, further comprising one or more support pads (440) coupled to the body (205).

3. The adjustable mount assembly (100) of claim 1, further comprising a housing (101) coupled to the body (205).

4. The adjustable mount assembly (100) of claim 3, wherein the housing (101) further comprises a removable access panel (102) positioned proximate the adjustment member (207).

5. The adjustable mount assembly (100) of claim 3, further comprising an aperture (317) formed in the housing (101) and adapted to receive a portion of the adjustment member (207).

6. The adjustable mount assembly (100) of claim 1, further comprising one or more rollers (319A, 319B) coupled to the body and adapted to engage the one or more retaining members (206A, 206B) between the first end (206A', 206B') and the second end (206A'', 206B'').

7. A method of forming an adjustable mount assembly, comprising steps of:
coupling an adjustment member to a body, wherein the adjustment member includes a threaded member and a tension bar coupled to the threaded member;
forming one or more channels in the body such that the tension bar can move within the one or more channels;
forming one or more retaining member receivers in the body; and
coupling a first end of a retaining member to the tension rod such that a second end of the retaining member is adapted to engage the retaining member receiver.

8. The method of claim 7, further comprising a step of coupling one or more support pads to the body.

9. The method of claim 7, further comprising a step of coupling a housing to the body.

10. The method of claim 9, further comprising a step of positioning a removable access panel on the housing proximate the adjustment member.

11. The method of claim 9, further comprising a step of forming an aperture in the housing that is adapted to receive a portion of the adjustment member.

12. The method of claim 7, further comprising a step of coupling one or more rollers to the body that are adapted to engage the one or more retaining members between the first end and the second end.

13. A method of coupling an adjustable mount assembly to a mount support, wherein the adjustable mount assembly includes a body, an adjustment member comprising a threaded member and a tension bar movable within one or more channels, one or more retaining members coupled to the adjustment member at a first end, and one or more retaining member receivers formed in the body of the adjustable mount assembly, the method comprising the steps of:
positioning the body of the adjustable mount assembly proximate a mount support;
wrapping a portion of the one or more retaining members around a portion of the mount support;
coupling a second end of the one or more retaining members to the one or more retaining member receivers; and
rotating the threaded member to move the tension bar within the one or more channels and the first end of the one or more retaining members in a first direction thereby increasing the tension in the one or more retaining members to secure the adjustable mount assembly to the mount support.

14. The method of claim 13, wherein the step of positioning the body of the adjustable mount assembly proximate the support member comprises engaging one or more support pads coupled to the body with a surface of the mount support.

* * * * *